(12) United States Patent
Voillequin et al.

(10) Patent No.: US 9,112,200 B2
(45) Date of Patent: Aug. 18, 2015

(54) ANODE FOR A CELL OF A LITHIUM-ION BATTERY, ITS MANUFACTURING PROCESS AND THE BATTERY INCORPORATING IT

(71) Applicant: Hutchinson, Paris (FR)

(72) Inventors: Baptiste Voillequin, Bois-le-Roi (FR); David Ayme-Perrot, Huningue (FR); Bruno Dufour, Champagne sur Seine (FR); Philippe Sonntag, Avon (FR)

(73) Assignee: Hutchinson, Paris (FR)

( * ) Notice: Subject to any disclaimer, the term of this patent is extended or adjusted under 35 U.S.C. 154(b) by 147 days.

(21) Appl. No.: 13/797,004

(22) Filed: Mar. 12, 2013

(65) Prior Publication Data

US 2013/0244098 A1    Sep. 19, 2013

(30) Foreign Application Priority Data

Mar. 13, 2012 (FR) ...................................... 12 52252

(51) Int. Cl.
*H01M 4/04* (2006.01)
*H01M 4/133* (2010.01)
*H01M 4/136* (2010.01)
*H01M 4/1391* (2010.01)
*H01M 4/1393* (2010.01)
*H01M 4/1397* (2010.01)
*H01M 4/1399* (2010.01)
*H01M 4/62* (2006.01)
*H01M 10/0525* (2010.01)
*H01M 4/38* (2006.01)
*H01M 4/485* (2010.01)

(52) U.S. Cl.
CPC .......... *H01M 4/0483* (2013.01); *H01M 4/0409* (2013.01); *H01M 4/0485* (2013.01); *H01M 4/133* (2013.01); *H01M 4/136* (2013.01); *H01M 4/1391* (2013.01); *H01M 4/1393* (2013.01); *H01M 4/1397* (2013.01); *H01M 4/1399* (2013.01); *H01M 4/38* (2013.01); *H01M 4/485* (2013.01); *H01M 4/622* (2013.01); *H01M 10/0525* (2013.01); *Y02E 60/122* (2013.01)

(58) Field of Classification Search
CPC ....... H04M 4/133; H04M 4/136; H04M 4/38; H04M 4/485
USPC .......................................................... 429/188
See application file for complete search history.

(56) References Cited

U.S. PATENT DOCUMENTS

| | | | |
|---|---|---|---|
| 5,749,927 A | 5/1998 | Chern et al. | |
| 6,294,257 B1 * | 9/2001 | Tsukakoshi et al. | 428/400 |
| 6,939,383 B2 | 9/2005 | Eastin et al. | |
| 2004/0121232 A1 | 6/2004 | Kato et al. | |
| 2007/0020528 A1 * | 1/2007 | Obrovac et al. | 429/322 |
| 2009/0023065 A1 * | 1/2009 | Hwang et al. | 429/220 |
| 2012/0015249 A1 * | 1/2012 | Awano et al. | 429/221 |

FOREIGN PATENT DOCUMENTS

| | | |
|---|---|---|
| DE | 101 18 639 A1 | 10/2002 |
| EP | 1 489 673 A1 | 12/2004 |
| FR | 1 250 457 A | 1/1961 |

OTHER PUBLICATIONS

Search Report for French Application No. 1252252 dated Sep. 14, 2012.

* cited by examiner

*Primary Examiner* — Stewart Fraser
(74) *Attorney, Agent, or Firm* — Alston & Bird LLP

(57) ABSTRACT

An anode usable in a cell of a lithium-ion battery comprising an electrolyte based on a lithium salt and a non-aqueous solvent, to a process for manufacturing this anode and to a lithium-ion battery having one or more cells incorporating this anode. This anode is based on a polymer composition, obtained by melt processing and without solvent evaporation, that is the product of a hot compounding reaction between an active material and additives having a polymer binder and an electrically conductive filler. The binder is based on at least one crosslinked elastomer and the additives furthermore include at least one non-volatile organic compound usable in the electrolyte solvent, the composition advantageously includes the active material in a mass fraction greater than or equal to 85%.

16 Claims, No Drawings

ANODE FOR A CELL OF A LITHIUM-ION BATTERY, ITS MANUFACTURING PROCESS AND THE BATTERY INCORPORATING IT

FIELD

The present invention relates to an anode that can be used in a cell of a lithium-ion battery, to a process for manufacturing this anode, and to a lithium-ion battery having one or more cells incorporating this anode.

BACKGROUND

There are two main types of lithium storage battery: lithium-metal batteries, where the negative electrode is made of lithium metal (which material causes problems with safety when in the presence of a liquid electrolyte), and lithium-ion batteries, where the lithium remains in the ionic state.

Lithium-ion batteries consist of at least two conductive Coulombic electrodes of different polarities, the negative electrode or anode and the positive electrode or cathode, between which electrodes a separator is located, which separator consists of an electrical insulator imbibed with an aprotic electrolyte based on $Li^+$ cations ensuring the ionic conductivity. The electrolytes used in these lithium-ion batteries usually consist of a lithium salt, for example of formula $LiPF_6$, $LiAsF_6$, $LiCF_3SO_3$ or $LiClO_4$, which is dissolved in a mixture of non-aqueous solvents such as acetonitrile, tetrahydrofuran, or more often a carbonate, for example of ethylene or propylene.

The active material of the anode of a lithium-ion battery is typically graphite (capacity of 370 mAh/g and redox potential of 0.05 V relative to the $Li^+/Li$ couple) or, as a variant, mixed metal oxides, among which are included the lithiated titanium oxides of formula $Li_4Ti_5O_{12}$, $Li_xTiO_2$, or even compounds, for example, of formula $Li_xCuVO_4$, $Li_xSnO_2$, $Li_xMoO_2$, $Li_xMoS_2$, where $0<x<5$. The reversible insertion/removal of lithium into/from these active anode materials takes place over electrochemical potentials that are generally higher than that of graphite.

The active material of the cathode of a lithium-ion battery is conventionally an oxide of a transition metal, such as an oxide of vanadium, nickel, manganese or cobalt, or, as a variant, it may be a lithiated iron phosphate.

The respective active materials of the cathode and anode of a lithium-ion battery allow reversible insertion/removal of lithium into/from these electrodes, and the higher the mass fraction of the active materials in the electrodes, the higher their capacity. These electrodes must also contain an electrically conductive compound, such as carbon black and, in order to provide them with sufficient mechanical cohesion, a polymer binder. A lithium-ion battery is thus based on the reversible exchange of lithium ions between the anode and the cathode during the charging and discharging of the battery, and, for a very low weight, by virtue of the physical properties of lithium, such a battery has a high energy density.

The anodes of lithium-ion batteries are most often manufactured using a process comprising, in succession, a step of dissolving or dispersing the various ingredients of the anode in a solvent, a step of spreading the obtained solution or dispersion on a metallic current collector, and then lastly a step of evaporating this solvent.

Processes for manufacturing the anodes of lithium-ion batteries that use an organic solvent have many drawbacks with respect to the environment and safety. In particular, it is, in this case, necessary to evaporate large amounts of such solvents, which are toxic or inflammable.

As for processes that use an aqueous solvent to manufacture these anodes, their major drawback is that the anode must be very thoroughly dried before they can be used, traces of water being known to limit the useful lifetime of lithium storage batteries. Mention may, for example, be made of document EP-B1-1 489 673, which describes a process for manufacturing an anode based on graphite and an elastomer binder, and using an aqueous solvent.

It is therefore highly desirable, for lithium-ion batteries, to prepare anodes that are manufactured without using solvents. It is in this context that processes for manufacturing anodes for lithium-ion batteries using melt processing techniques (for example extrusion) have been described in the literature.

Unfortunately, these melt processes cause major difficulties in the case of lithium-ion batteries, which, as is known, require a mass fraction of active material in the polymer mixture of the anode of at least 85% for the latter to have sufficient capacity in the lithium-ion battery. However, at such contents of active material the viscosity of the anode polymer mixture becomes very high, and leads to a risk of the mixture over-heating and losing its mechanical cohesion once it is in use.

Document US-B2-6 939 383 describes the extrusion of a polymer composition comprising a poly(ethylene oxide)-polypropylene oxide)-poly(glycidyl ether) copolymer by way of ionically conducting polymer, for solventless processing of an anode or cathode for a lithium-polymer battery. However, the mass fraction of active material in the single polymer composition prepared in this document is only 64.5% and, furthermore, it relates to a cathode.

Document US-A-5 749 927 discloses a process for the continuous preparation of lithium-polymer batteries by extrusion, which process comprises compounding the anode or cathode active material with an electrical conductor and a solid electrolyte composition comprising a polymer, a lithium salt and a propylene carbonate/ethylene carbonate mixture greatly in excess over this polymer. In this document, the mass fraction of active material present in the only anode polymer composition obtained is also below 70%.

Thus, a major drawback of these known melt processes for manufacturing anodes for lithium storage batteries is that the mass fractions of active material in the anode polymer composition are insufficient to obtain high-performance anodes specifically for lithium-ion batteries.

SUMMARY

One aim of the present invention is therefore to provide a process, for manufacturing an anode, that overcomes all of the aforementioned drawbacks, and this aim is achieved since the Applicant has discovered, surprisingly, that if an active material and additives comprising a crosslinkable elastomer matrix, an electrically conductive filler and a non-volatile (i.e. having a boiling point above 150° C. at an atmospheric pressure of $1.013 \times 10^5$ Pa) organic compound, are hot compounded by melt process and without solvent evaporation, then an anode polymer composition is obtained, after crosslinking, that is usable in a lithium-ion battery comprising an electrolyte based on a lithium salt and a non-aqueous solvent, with a fraction of this active material in the composition clearly higher than those obtained previously by melt processing, and advantageously greater than or equal to 85%, the one or more organic compounds advantageously being used as a solvent for the electrolyte.

An anode according to the invention, usable in a cell of a lithium-ion battery comprising an electrolyte based on a lithium salt and a non-aqueous solvent, is thus based on a polymer composition, obtained by melt processing and without solvent evaporation, that is the product of a hot compounding reaction between an active material and additives comprising a polymer binder and an electrically conductive filler, and the anode is such that the binder is based on at least one crosslinked elastomer and such that these additives furthermore comprise at least one non-volatile organic compound that is usable in this electrolyte solvent, the composition comprising the active material in a mass fraction advantageously greater than or equal to 85%.

Even more advantageously, said composition may comprise said active material in a mass fraction of 90% or more, or even 93% or more.

It will be noted that this very high mass fraction of active material in the anode according to the invention ensures that the or each cell obtained is a high-performance cell and therefore that the lithium-ion battery incorporating them is a high-performance battery.

It will also be noted that the uniform distribution of said at least one crosslinked elastomer in the composition ensures the mechanical strength of the anode.

It will furthermore be noted that an anode according to the invention is totally water-free, in contrast to those of aforementioned document EP-B1-1 489 673.

Advantageously, said active material may comprise at least one compound or complex that is chosen from the group consisting of graphite, lithiated titanium oxides, the lithiated compounds of formula $Li_xCuVO_4$, $Li_xSnO_2$, $Li_xMoO_2$ and $Li_xMoS_2$ (where 0<x<5), and the lithiated metal sulphides of formula $LiVS_2$ or $LiTi_2S_2$, and that is preferably chosen from the lithiated titanium oxides of formula $Li_4Ti_5O_{12}$ or $Li_xTiO_2$.

It will be noted that, advantageously, the lithiated titanium oxide $Li_4Ti_5O_{12}$, which has a capacity of 170 mAh/g, has a very high cyclability, due to the fact that its volume does not change greatly during charge/discharge cycles (i.e. cycles of insertion/removal of $Li^+$), a capacity to withstand high rates, and a high thermal stability. In addition, by virtue of its high redox potential of 1.5 V, relative to the $Li^+/Li$ couple, this lithiated titanium oxide ensures that the electrolytes used exhibit a satisfactory stability when in contact with the anode that incorporates it, no solid interphase forming between the anode and the electrolyte.

Preferably, said at least one elastomer is a peroxide-crosslinked diene elastomer and, even more preferably, a hydrogenated nitrile rubber (HNBR). Also preferably, said at least one elastomer may be present in said composition in a mass fraction between 1% and 10%.

Advantageously, said at least one non-volatile organic compound may comprise a carbonate, preferably a carbonate of at least one olefin such as ethylene, which is preferably used in the electrolyte composition.

It will be noted that using such a carbonate, such as an ethylene carbonate, advantageously allows:
the filler content in the composition to be increased;
the inherent risks with respect to the toxicity of volatile organic compounds (VOC), used in conventional processes for manufacturing anodes, to be avoided because this carbonate is a product that is solid at room temperature and much less hazardous to handle; and
the anode polymer composition to be used without evaporating the carbonate beforehand, and the incorporation of the electrolyte into the anode to be made easier because this carbonate is one of the main constituents of electrolytes used at the present time in lithium-ion batteries.

Also advantageously, said at least one organic compound may be present in said composition in a mass fraction between 0.1% and 5%.

Preferably, the mass ratio of the volatile organic compound (s)/crosslinked elastomer of the binder is lower than 1.

It will be noted that the invention allows the salts required for operation of the anode to be incorporated during its manufacture.

According to another feature of the invention, said additives may furthermore comprise a crosslinking system that is present in the composition in a mass fraction between 0.05% and 0.20%, and that preferably comprises an organic peroxide and a crosslinking co-agent in the case where said at least one elastomer is a diene elastomer such as a hydrogenated nitrile rubber (HNBR).

According to another feature of the invention, said electrically conductive filler may be chosen from the group consisting of carbon black, graphite, expanded graphite, carbon fibres, carbon nanotubes, graphene and their mixtures, and is present in the composition in a mass fraction between 1% and 6%.

A process, according to the invention, for manufacturing an anode such as defined above, is characterized in that it comprises:

a) melt compounding, without solvent evaporation, in an internal mixer or an extruder, of said active material and said additives comprising said binder and said organic compound in the solid state in order to obtain said composition in the crosslinkable state, this active material preferably comprising at least one compound or complex such as graphite or a lithiated titanium oxide; and b) crosslinking and optionally hot forming this composition, in order to obtain said crosslinked composition.

According to another feature of the invention, step a) may be carried out by compounding said binder into a powder premix of the other ingredients of the composition, for example at a temperature between 80° C. and 120° C. in an internal mixer.

According to another feature of the invention, step b) may be carried out by hot pressing said crosslinkable composition.

Advantageously, the process of the invention may then comprise a step c) of rolling said crosslinked composition so as to deposit it on a metallic current collector with which said anode is equipped.

A lithium-ion battery according to the invention comprises at least one cell comprising an anode such as defined above, a cathode, and an electrolyte based on a lithium salt and a non-aqueous solvent.

According to another advantageous feature of the invention said electrolyte solvent may comprise said at least one non-volatile organic compound of the anode.

According to another aspect of the invention, said anode comprises a metallic current collector making contact with at least one film made of said polymer composition.

Advantageously, the cathode of this battery may be based on an active material comprising at least one lithiated polyanionic compound or complex having an operating voltage below 4 V and preferably carbon coated, such as a lithiated metal M phosphate of formula $LiMPO_4$, where M is for example an iron atom. Even more advantageously, this cathode may be obtained according to the process described in patent application FR1250 457 filed on 17 Jan. 2012 in the name of the Applicant.

Other features, advantages and details of the present invention will become clear from reading the following non-limiting description of several exemplary embodiments of the invention, given by way of illustration.

DETAILED DESCRIPTION

Example 1

An anode polymer composition was prepared in a Haake internal mixer at 90° C., the composition having the following formulation expressed in mass fraction (%):

| | |
|---|---|
| HNBR binder ("Therban 4307") | 2.82 |
| Carbon black | 2.72 |
| Ethylene carbonate | 0.52 |
| Active material $Li_4Ti_5O_{12}$ | 93.84 |
| Crosslinking system: | |
| Dicumyl peroxide | 0.04 |
| Triallyl cyanurate (TAC) | 0.05 |

The various compounds were introduced into this internal mixer in succession, starting with the hydrogenated nitrile rubber by way of a crosslinkable diene elastomer (HNBR binder), and then a premix in powder form of the other ingredients above. After this compounding, and hot pressing at 170° C. for 15 minutes simultaneously allowing the binder to be crosslinked, several electrodes having a thickness ranging from 0.4 mm to 2 mm, each able to form an anode inside a cell of a lithium-ion battery, after deposition on a current collector with which this anode is equipped, were obtained directly.

Example 2

Another anode polymer composition based on the same ingredients as used in example 1 was prepared in a Haake internal mixer at 110° C., the composition however having the following different formulation expressed in mass fraction (%):

| | |
|---|---|
| HNBR binder ("Therban 4307") | 8.23 |
| Carbon black | 4.15 |
| Ethylene carbonate | 1.64 |
| Active material $Li_4Ti_5O_{12}$ | 85.69 |
| Crosslinking system: | |
| Dicumyl peroxide | 0.12 |
| Triallyl cyanurate (TAC) | 0.15 |

The various compounds were introduced into this internal mixer in succession, starting with the hydrogenated nitrile rubber by way of a crosslinkable diene elastomer (HNBR binder), and then a premix in powder form of the other ingredients above. After this compounding, and hot pressing at 170° C. for 15 minutes simultaneously allowing the binder to be crosslinked, several electrodes having a thickness ranging from 0.4 mm to 2 mm, each able to form an anode inside a cell of a lithium-ion battery, after deposition on a current collector with which this anode is equipped, were obtained directly.

Example 3

Another anode polymer composition based on an active material other than that used in examples 1 and 2, and on the same other ingredients used in these examples, was prepared in a Haake internal mixer at 110° C., the composition having the following different formulation expressed in mass fraction (%):

| | |
|---|---|
| HNBR binder ("Therban 4307") | 5.17 |
| Carbon black | 2.28 |
| Ethylene carbonate | 1.19 |
| Active material ("Timrex KS 6L" graphite) | 91.17 |
| Crosslinking system: | |
| Dicumyl peroxide | 0.08 |
| Triallyl cyanurate (TAC) | 0.11 |

The various compounds were introduced into this internal mixer in succession, starting with the hydrogenated nitrile rubber by way of a crosslinkable diene elastomer (HNBR binder), and then a premix in powder form of the other ingredients above. After this compounding, and hot pressing at 170° C. for 15 minutes simultaneously allowing the binder to be crosslinked, several electrodes having a thickness ranging from 0.4 mm to 2 mm, each able to form an anode inside a cell of a lithium-ion battery, after deposition on a current collector with which this anode is equipped, were obtained directly.

It will be noted, with reference to these exemplary embodiments of the invention, that the very high mass fraction (higher than 85%, indeed even higher than 90%) of the active material in this anode ensures that the or each cell thus obtained is a high-performance cell and therefore that the lithium-ion battery incorporating them is a high-performance battery.

The invention claimed is:

1. Anode usable in a cell of a lithium-ion battery comprising an electrolyte based on a lithium salt and a non-aqueous electrolyte solvent, the anode being based on a polymer composition, obtained by melt processing and without solvent evaporation, that is the product of a hot compounding reaction between an active material and additives comprising a polymer binder and an electrically conductive filler, characterized in that said binder is based on at least one crosslinked elastomer and in that said additives furthermore comprise at least one non-volatile organic compound which has a boiling point above 150° C. at an atmospheric pressure of $1.013 \times 10^5$ Pa, is solid at room temperature and which is usable in said non-aqueous electrolyte solvent, the composition comprising said active material in a mass fraction greater than or equal to 85%.

2. Anode according to claim 1, wherein said composition comprises said active material in a mass fraction of 90% or more.

3. Anode according to claim 1, wherein said active material comprises at least one compound or complex that is chosen from the group consisting of graphite, lithiated titanium oxides, the lithiated compounds of formula $Li_xCuVO_4$, $Li_xSnO_2$, $Li_xMoO_2$ and $Li_xMoS_2$ (where 0<x<5), and the lithiated metal sulphides of formula $LiVS_2$ or $LiTi_2S_2$, and that is preferably chosen from among the lithiated titanium oxides of formula $Li_4Ti_5O_{12}$ or $Li_xTiO_2$ (where 0<x <5).

4. Anode according to claim 1, wherein said at least one elastomer is a peroxide-crosslinked diene elastomer.

5. Anode according to claim 1, wherein said at least one elastomer is present in said composition in a mass fraction between 1% and 10%.

6. Anode according to claim 1, wherein said at least one organic compound comprises a carbonate.

7. Anode according to claim 1, wherein said at least one organic compound is present in said composition in a mass fraction between 0.1% and 5%.

8. Anode according to claim 1, wherein said additives furthermore comprise a crosslinking system that is present in said composition in a mass fraction between 0.05% and 0.20%, and that comprises an organic peroxide and a crosslinking co-agent in the case where said at least one elastomer is a diene elastomer.

9. Anode according to claim 1, wherein said additives furthermore comprise a crosslinking system that is present in said composition in a mass fraction between 0.05% and 0.20%, and that comprises an organic peroxide and a crosslinking co-agent in the case where said at least one elastomer is a hydrogenated nitrile rubber (HNBR).

10. Anode according to claim 1, wherein said electrically conductive filler is chosen from the group consisting of carbon black, graphite, expanded graphite, carbon fibers, carbon nanotubes, graphene and their mixtures, and is present in said composition in a mass fraction between 1% and 6%.

11. Lithium-ion battery comprising at least one cell comprising an anode, a cathode and an electrolyte based on a lithium salt and a non-aqueous solvent, wherein said anode is such as defined in claim 1.

12. Lithium-ion battery according to claim 11, wherein that said electrolyte solvent comprises said at least one non-volatile organic compound of the anode.

13. Lithium-ion battery according to claim 11, wherein said anode comprises a metallic current collector making contact with at least one film made of said polymer composition.

14. Lithium-ion battery according to claim 11, wherein said cathode is based on an active metal comprising at least one lithiated polyanionic compound or complex having an operating voltage below 4 V.

15. Lithium-ion battery according to claim 11, wherein said cathode is based on an active metal comprising at least one lithiated polyanionic compound or complex having an operating voltage below 4 V and being carbon coated.

16. Lithium-ion battery according to claim 11, wherein said cathode is based on an active metal comprising at least one lithiated metal M phosphate of formula $LiMPO_4$, where M is an iron atom.

* * * * *